March 6, 1962    A. D. COGGESHALL    3,024,302
INSULATING TENSION MEMBER AND METHOD OF MANUFACTURE
Filed June 3, 1960
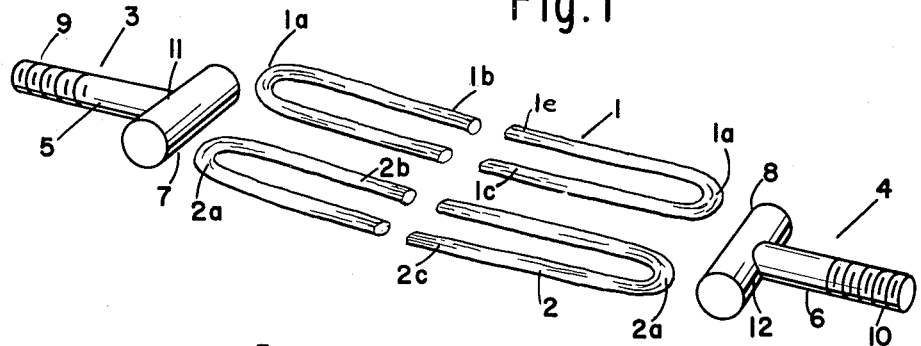
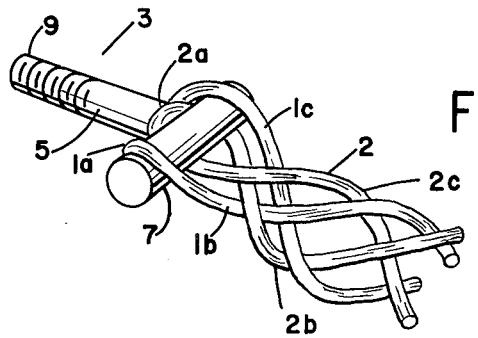
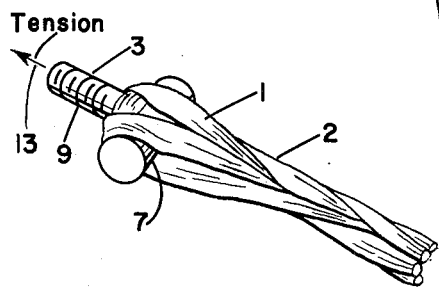
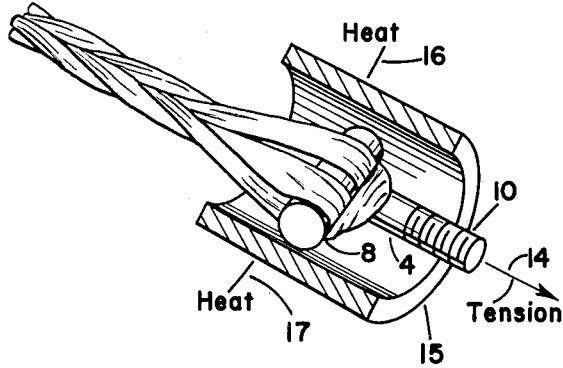
Inventor
Almy D. Coggeshall
by W. C. Crutcher
His Attorney

United States Patent Office 3,024,302
Patented Mar. 6, 1962

3,024,302
INSULATING TENSION MEMBER AND METHOD
OF MANUFACTURE
Almy D. Coggeshall, Schenectady, N.Y., assignor to General Electric Company, a corporation of New York
Filed June 3, 1960, Ser. No. 33,809
6 Claims. (Cl. 174—177)

This invention relates to an insulated structural member for use in electrical apparatus, and more particularly it relates to a high strength insulating tension member which is initially flexible for ease of assembly, but which is rigid in its final cured state.

High voltage electrical devices, such as transformers or large turbine-generators, often employ electrical conducting members of significant size. Under certain conditions of loading or operation of the apparatus, these conductors are subjected to magnetic or mechanical disturbances tending to dislodge them. To this end, elaborate structures are often employed to hold them securely in position.

One example of such a structure is the end winding support system for a large generator where the connecting end turns are secured to a structural member and tension members may be employed as components of the structure to hold the end turns in place and to adjust for irregularities. An example of such an end turn support system is disclosed in a co-pending application Serial No. 33,808, filed in the names of J. J. Bahn, A. D. Coggeshall, R. T. Maher and J. B. Waldbillig on June 3, 1960 and assigned to the assignee of the present application. There a tension member is employed, and due to the configuration of the end turns, interfering blocking, other structural members, etc., the tension member must be threaded through a fairly intricate passageway before it is located in its final position. Hence, flexibility of the tension member during assembly is important.

It is also important that a tension member used in electrical apparatus in the vicinity of the conductors be composed of insulating materials to eliminate induction heating effects. The tension member disclosed in this application satisfies this requirement.

It is known that a single glass fiber in pure tension has a very high tensile strength. The strength may be increased in proportion to the number of individual fibers by grouping the fibers into strands, provided that each fiber receives its proportionate share of the load. However, if a strand of fibers is loaded so that the fibers are unequally stressed, it will be appreciated that the one receiving the greatest load will break first, followed by the others successively, and the benefits of grouping the fibers will not be realized. Similarly, if a number of strands are grouped and the strands are unequally stressed, the group of strands will not have the load-bearing capacity it would have if the strands were equally stressed. Hence it is very important in designing a tension member fabricated of glass fiber to insure that all fibers are arranged in an optimum load-sharing relation to each other.

Another problem encountered when designing a tension member of glass fiber is that of devising suitable members to hold the opposite ends of the strands. It is found to be much easier to obtain equal loading of the fibers by using continuous loops and to devise special end holding structures to retain opposite ends of the loops so that the loop will not fail fiber-by-fiber. However, open hooks over which the "bight" of the loop may be placed allow the loop to become dislodged from the hook during handling. Closed eyelets, on the other hand, require that the glass fiber loops be formed by threading the strands or the separate fibers through the eyelet.

Uniformity of load sharing between fibers can be further enhanced by bonding the fibers together by curing a resin with which the fibers have been previously impregnated. Numerous polymerizable resins are known in the reinforced plastics art and curing may be obtained by heat, or by other means, to cause the resin to solidify.

Accordingly, one object of the present invention is to provide an improved glass fiber, resin-bonded insulating tension member.

Another object is to provide an improved construction for attaching multi-fiber loops to an end fitting or anchor member.

Another object is to provide an improved stranded tension member which is flexible for ease of assembly but which can be cured to a rigid state after assembly.

Still another object is an improved means for securing the bights of loop members to a terminating member so that the bights will not become disengaged and so that the loops will share the tension load substantially equally.

Another object of the invention is to provide an improved method for pre-curing the end bight portions of multi-fiber loops in the optimum load-sharing configuration, so that fibers in the central portion of the loop will bear their proportionate share of the load when they are later cured.

The subject matter which is regarded as the invention is particularly pointed out and distinctly claimed in the concluding portion of this specification. The invention, however, both as to organization and method of practice, together with further objects and advantages thereof, may best be understood by reference to the following description taken in connection with the accompanying drawing in which:

FIG. 1 is a perspective view showing components of the tension member prior to assembly;

FIG. 2 is an enlarged view in perspective of one end of the tension member illustrating the method of assembly; and FIG. 3 is a perspective view of the assembled tension member illustrating diagrammatically the method of pre-curing the bight portions of the loops.

Generally stated, the invention is practiced by providing at least two continuous loops of multi-fiber high strength insulating material impregnated with a curable resin and at least one substantially T-shaped end piece threaded for adjusting the tension. The two loops are preferably loosely intertwined commencing from opposite sides of the T cross-piece and braided throughout their length to be attached to a similar end member or to a suitable hook. Tension may be applied to the end pieces to cause the fibers to assume their optimum load-sharing configuration, and the resin "pre-cured" in the bight portions of the loops to prevent the loops from becoming disengaged from the T cross-pieces during handling.

Referring now to FIG. 1 of the drawing, a pair of multi-fiber loops, preferably fabricated from glass fiber roving by any of various known methods, are shown generally at 1, 2, each of which has been impregnated in a curable resin. The loops have bight portions 1a, 2a and center connecting portions 1b, 1c, 2b, 2c. Two or more loops could also be used in place of each single loop 1, 2.

The loops 1, 2 are preferably composed of several strands such as indicated at 1e. The minimum number of strands in a loop should be at least ten so that the load on the terminations of the strands shall be a minor fraction of the load on the whole assembly. Also the number of strands used for a particular application will vary with the size of the strand, the dimensions of the hardware, and the desired strength and/or flexibility desired in the final form. It is important to note that little or no twisting is imparted to the strands 1e in loops 1, 2, in order that the strands will be subjected to substantially pure tension.

Each strand 1e, in turn, may consist of many individual fibers of an insulating material, such as glass fiber, having a high tensile strength and of relatively small cross-section. Glass fiber is ideally suited for this application, since it both fulfills the requirement that loops 1, 2 be of electrical insulating material and that the fibers be of high tensile strength.

The fibers are preferably coated or impregnated with a heat curable resin although other means for curing, such as a catalyst, may be utilized. Many such resins are known to the art, but for this application it is preferred to use a resin commonly known to the trade as a styrene-bearing unsaturated polyester resin. Numerous examples of such material are commercially available and may be caused to solidify by the action of a peroxide curing agent.

It will of course be apparent that epoxy or other suitable resins could be substituted for the binding material. Such resins can be designed to cure either at elevated temperatures or at room temperature. Curing systems which permit room temperature solidification are well known, a typical example being the incorporation of 0.2% of a cobalt salt, for example cobalt naphthanate in the resin followed by an addition of a peroxide such as methyl-ethylketone peroxide. With this curing system, solidification of the resin will take place, depending on the formulation, within 20 minutes to 4 hours.

The other components of the tension member are the end pieces shown generally as 3, 4. These are generally T-shaped members having projecting "legs" 5, 6 and "cross-pieces" 7, 8 respectively. The cross-pieces 7, 8 are substantially perpendicular to the "line of action" of the tension member and the legs 5, 6 are parallel to the "line of action." The legs 5, 6 are threaded as shown at 9, 10 to recevie nuts (not shown) with which the tension may be increased on the assembled member. Although two similar end pieces are shown, it will be understood that if a suitable hook is provided on the structure with which the tension member is used, one of the end pieces may be eliminated.

Cross-pieces 7, 8 are shown here as formed conveniently from short rod sections attached to legs 5, 6 by welds 11, 12, but they may take many other forms. They may, for instance, be of rectangular cross-section to simplify the joining to legs 5, 6, but a circular cross-section, as shown, has the great advantage of reducing stress concentrations in the fibers of loops 1, 2.

Referring now to FIG. 2 of the drawing, the method of assembly of the loops to the end piece of the tension member illustrated. There will be seen that first bight 1a of loop 1 is passed over the top of cross-piece 7, over the end of leg 5, and pulled tight so that bight 1a is underneath leg 5. Next, bight 2a of loop 2 is inserted between the extending side portions 1b, 1c of loop 1, passed beneath the underside of cross-piece 7, over the end of leg 5, and pulled up snugly so that bight 2a is around the top side of leg 5, as shown in FIG. 2. The loops 1, 2 are then preferably each given a half-twist as shown.

Next the free bight of loop 1 (not shown) is brought upwards from beneath, between the extending portions 1b, 1c of loop 1 after being given another half-twist. The braiding or weaving continues thus until the loops 1, 2 have been substantially used up, enough slack being left for the assembly of the free end bight of loops 1 and 2 on the opposite end member 4, in the manner described in connection with end piece 3. It will be noted that the braid is rather "loose," rather than "tight," in order that the fibers will be substantially in pure tension.

If the tension member were now caused to harden by curing the resin impregnating fibers of loops 1, 2, the fibers would not necessarily be in their optimum load-sharing configuration and the member might be susceptible to tension failure fiber-by-fiber. Moreover, the cured member would be rigid throughout and therefore subject to the disadvantages during assembly of the rigid tension members previously used.

To this end, FIG. 3 illustrates an additional step to improve the load-bearing capability of the tension member. Appropriate tension is applied to the opposite ends of the assembled tension member as illustrated graphically by arrows 13, 14. The threaded portions 9, 10 provide ready means for attaching a suitable tension applying means (not shown) to the member. As the tension is applied, the fibers in each loop and the loops themselves automatically adjust and rearrange their position so as to share the load equally, since the resin has not yet been cured and is in a flexible or pliable state, allowing the fibers to slip on one another. After the fibers and strands have adjusted themselves so as to be under uniform load, heat is applied in the vicinity of cross-pieces 7, 8, so as to pre-cure the resin in the bight portions 1a, 2a of the loops at the location where they enclose cross-pieces 7, 8. This "pre-stressing" and curing operation also serves to compact the load-carrying fibers into a solid homogeneous bundle of fibers.

The manner of applying heat to the bights 1a, 2a is shown symbolically by a portion of a cylinder 15 broken away to show only half of the cylinder, and arrows 16, 17 indicating application of heat to the cylinder. Arrows 16, 17 symbolize the appropriate application of heat, as by externally heating with a flame or infra-red lamp, by induction heating of member 4 by eddy currents produced by a coil in the position of the cylinder 15, or by embedding resistance heating wires within the cylinder, or any other convenient means.

It is important to note that this initial curing of the resin takes place only in the bights 1a, 2a of loops 1, 2 leaving the center connecting portions of the loops flexible or pliable for ease of assembly. It is also important to note that the fibers are tensioned so as to be in their optimum load-sharing relation to each other when this pre-curing takes place. Thus when the tension represented by arrows 13, 14 is relaxed, the filaments of the multi-fiber loops are retained in this optimum load-sharing configuration by the cured resin.

The operation and use of my improved insulating tension member will be apparent from the following.

The tension member is assembled as described previously, and the ends of the loops are pre-cured in the vicinity of the cross-pieces 7, 8 while the member is held under tension. The tension member thus formed is a very useful component for tying together the structure of electrical apparatus. For example, one end piece 4 may be attached to the frame structure of a machine, as by passing leg 6 through a hole in a frame member and securing a nut on threads 10. Next the other end piece 3 can be "snaked" through intricate passageways defined between conductor bars and other structural members and finally placed in a similar hole and secured with a nut. Suitable tension can be exerted on the member to secure the structural members and cause the uncured portion of the tension member to adjust itself to the shape of the members it contacts. Other similar tension members are assembled in the structure, and the uncured portions of the tension members are cured, as by baking the entire assembly in an oven.

Because the resin-impregnated glass fiber roving may have a tendency to become sticky, tacky or objectionable to handle during assembly, it may be useful to dust the uncured portions of the finished tension members lightly with a coat of mica dust, which eliminates the "surface tack," and later to give the final assembly a coat of lacquer.

The advantages of such a tension member are many. In addition to flexibility during assembly, great strength is achieved in the final cured form. The strength of such a member in relation to its size may be startling. For example, a tension member having two loops, each composed of 15 strands, each strand having 60 glass fibers and bonded with the styrene-bearing polyester resin described, provides a finished member with a cross-section of only ½ inch diameter with a breaking strength in excess of 10,000 pounds.

The feature of initially hardening the bights of the loop with the fibers in their optimum load-sharing relation also locks the end pieces 3, 4 to the loops so that they will not accidentally become disengaged during assembly. An examination of the drawing will illustrate that when the loops are pulled taut and the bights made rigid, the bights completely encircle the cross-pieces so that it is impossible to disengage the end piece from the loop. This is a great advantage where the tension members are used in factory assembly of a very complex electrical machine like a large generator.

While there has been described what is at present considered to be the preferred embodiment of the invention, it will be understood that still other modifications may be made, and it is intended to cover by the appended claims all such modifications as fall within the true spirit and scope of the invention.

What I claim as new and desire to secure by Letters Patent of the United States is:

1. A stranded tension member comprising multiple strands of filaments including at least two loops of high tensile strength filaments having a curable coating, at least one T-shaped end fitting member having a cross-piece forming projecting side portions on either side of the leg of the T, each loop having an end bight portion passing over said cross-piece side portion and around the leg of the T in the opposite sense from an end bight portion of the other loop, said coating in the end bight portion being cured to hold the filaments in fixed relation to each other and to prevent the disengagement of the bight portions from the end fitting member.

2. An insulating stranded tension member in accordance with claim 1, in which the loops are fabricated of glass fiber strands impregnated with a resin curable to a substantially rigid mass.

3. A stranded tension member comprising a pair of loosely braided loops each including a plurality of continuous turns of a multi-fiber strand of high tensile strength fibers coated with a curable resin, at least one T-shaped end piece having a cross-piece forming projecting side portions on either side of the leg of the T, each loop having an end bight portion passing over said cross-piece side portions and around the leg of the T in the opposite sense from an end bight portion of the other loop, said resin in the end bight portions being cured to hold the fibers in a predetermined arrangement and to prevent the disengagement of the bight portions from the end piece.

4. A tension member comprising a pair of spaced oppositely facing end pieces each having cross-pieces on either side with a portion extending substantially perpendicular to a line between said end pieces and each having a leg extending away from the other end piece, and a loosely braided assembly of multi-fiber insulating material extending between the end members, said braided assembly including a pair of continuous loops of glass fiber material impregnated with a curable resin, each of said loops having an end bight portion passing over a said cross-piece perpendicular portion and around the leg of the end piece in the opposite sense from an end bight portion of the other said loop, the impregnating resin in said end bight portions being cured initially to hold the fibers in a fixed relation to each other and to prevent the disengagement of the bight portion from the cross-pieces.

5. A tension member for use in electrical apparatus comprising a pair of spaced T members having cross-pieces substantially parallel to one another and having legs extending in opposite directions, at least one of said T member legs being threaded to provide for adjusting the relative spacing between said T members, and an assembly of multi-fiber insulating material extending between the T members, said braided assembly including first and second continuous loops formed from a plurality of turns of a single strand, each strand comprising glass fibers coated with a heat curable resin, said first loop having an end bight portion passing over one of said T member cross-pieces and around the leg of the T member, said second loop having an end bight portion passing beneath said T cross member and around the leg of the T member in an opposite sense from said first loop, the central portion of said tension member being of a loosely braided construction, the resin in said end bight portions being cured to hold the fibers in fixed relation to each other and to prevent the disengagement of the bight portions from the T member cross-pieces.

6. The method of manufacturing a stranded tension member which comprises the steps of providing an end piece having a body portion and a cross-piece with portions extending from opposite sides of said body portion, providing a pair of loops of multiple continuous turns of high tensile strength fiber impregnated with a curable resin, passing the bight of a first loop over said cross-piece and around the body portion of the end piece, passing the bight of a second loop over the opposite side of said cross-piece from the first loop and around the body portion in the opposite sense from the first loop, loosely braiding the intermediate portions of the loops by alternately passing the free end bight of each loop between the sides of the other loop, applying tension to said braided assembly, whereby the fibers assume an optimum tensile load-sharing configuration relative to each other, and causing the resin to cure in said end bight portions so as to retain the fibers in said configuration and to prevent accidental disengagement of the bight portions of the loops from the end member when the tension is released.

References Cited in the file of this patent

UNITED STATES PATENTS

| | | |
|---|---|---|
| 2,774,900 | Acton et al. | Dec. 18, 1956 |
| 2,877,368 | Sheldon | Mar. 10, 1959 |
| 2,970,186 | Von Platen | Jan. 31, 1961 |

FOREIGN PATENTS

| | | |
|---|---|---|
| 775,773 | Great Britain | May 29, 1957 |
| 1,189,016 | France | Mar. 16, 1959 |